US012667958B2

(12) United States Patent
Tanaami et al.

(10) Patent No.: US 12,667,958 B2
(45) Date of Patent: Jun. 30, 2026

(54) PICKING-UP ROBOT

(71) Applicant: SINTOKOGIO, LTD., Nagoya (JP)

(72) Inventors: Yoshikane Tanaami, Nagoya (JP);
Miyuki Hayashi, Nagoya (JP)

(73) Assignee: SINTOKOGIO, LTD., Aichi (JP)

( * ) Notice: Subject to any disclaimer, the term of this
patent is extended or adjusted under 35
U.S.C. 154(b) by 273 days.

(21) Appl. No.: 18/303,188

(22) Filed: Apr. 19, 2023

(65) Prior Publication Data

US 2023/0381953 A1 Nov. 30, 2023

(30) Foreign Application Priority Data

May 31, 2022 (JP) ................................. 2022-089099

(51) Int. Cl.
| | |
|---|---|
| *B25J 9/10* | (2006.01) |
| *B25J 5/00* | (2006.01) |
| *B25J 9/16* | (2006.01) |
| *B25J 15/08* | (2006.01) |

(52) U.S. Cl.
CPC .............. *B25J 9/104* (2013.01); *B25J 5/005*
(2013.01); *B25J 9/1697* (2013.01); *B25J*
*15/08* (2013.01)

(58) Field of Classification Search
CPC . B25J 9/104; B25J 5/005; B25J 9/1697; B25J
15/08; B25J 9/162; B25J 18/025; F16G
13/20; G05B 2219/40298
See application file for complete search history.

(56) References Cited

U.S. PATENT DOCUMENTS

| | | | | |
|---|---|---|---|---|
| 4,329,076 | A | * | 5/1982 | Coreth ................... F16B 7/1427 |
| | | | | 403/109.8 |
| 5,733,096 | A | * | 3/1998 | Van Doren ............ B25J 18/025 |
| | | | | 414/744.5 |
| 2004/0130085 | A1 | | 7/2004 | Lim |
| 2006/0280587 | A1 | * | 12/2006 | Guerra ...................... B25J 9/104 |
| | | | | 414/749.1 |
| 2016/0123521 | A1 | * | 5/2016 | Raabe ...................... B66C 13/12 |
| | | | | 248/298.1 |
| 2017/0001524 | A1 | * | 1/2017 | Vahle ...................... B66C 13/12 |

(Continued)

FOREIGN PATENT DOCUMENTS

| | | | | | |
|---|---|---|---|---|---|
| CN | 101870102 | B | * | 12/2013 | .............. B25J 9/045 |
| CN | 108098750 | A | * | 6/2018 | ................ B25J 9/10 |

(Continued)

OTHER PUBLICATIONS

L. Bogdan and E. Toma, "New Solution for Telescopic Robotic
Arm," AMM, vol. 658, pp. 557-562, Oct. 2014, doi: 10.4028/www.
scientific.net/amm.658.557. Available: http://dx.doi.org/10.4028/
www.scientific.net/AMM.658.557 (Year: 2014).*

(Continued)

*Primary Examiner* — Scott A Browne
*Assistant Examiner* — Tyler Roger Robarge
(74) *Attorney, Agent, or Firm* — Harness, Dickey &
Pierce, P.L.C.

(57) ABSTRACT

A picking-up robot is successfully made more compact. The
robot arm includes a plurality of arm tubes that fit one within
another in a nested manner. A push chain is inserted in the
robot arm. The push chain is connected to a foremost arm
tube at one end of the push chain. A sprocket is rotatably
attached to the strut. The push chain is engaged on the
sprocket.

8 Claims, 7 Drawing Sheets

(56) References Cited

U.S. PATENT DOCUMENTS

| | | | |
|---|---|---|---|
| 2017/0259435 A1 | 9/2017 | Yoon | |
| 2017/0291310 A1 | 10/2017 | Yoon et al. | |
| 2018/0079073 A1 * | 3/2018 | Meeker | B62D 55/075 |
| 2019/0145498 A1 * | 5/2019 | Yoon | F16H 19/0663 |
| | | | 74/490.04 |
| 2019/0366556 A1 * | 12/2019 | Wang | B25J 15/0293 |
| 2021/0129358 A1 | 5/2021 | Amemiya et al. | |
| 2021/0146542 A1 * | 5/2021 | Kiyosawa | B25J 13/089 |

FOREIGN PATENT DOCUMENTS

| | | | | | | |
|---|---|---|---|---|---|---|
| CN | 108356849 | A | * | 8/2018 | | B25J 18/025 |
| CN | 108724247 | A | * | 11/2018 | | |
| CN | 108890656 | A | * | 11/2018 | | B25J 11/008 |
| CN | 111452087 | A | * | 7/2020 | | B24C 9/00 |
| CN | 112692869 | A | * | 4/2021 | | B25J 18/025 |
| CN | 109562523 | B | * | 3/2022 | | B25J 18/02 |
| CN | 215949537 | U | * | 3/2022 | | |
| CN | 114750198 | A | * | 7/2022 | | B25J 15/08 |
| CN | 216883954 | U | * | 7/2022 | | |
| EP | 3868519 | A2 | * | 8/2021 | | B25J 17/0225 |
| JP | H04122596 | A | | 4/1992 | | |
| JP | H0852684 | A | | 2/1996 | | |
| JP | 2004-195637 | A | | 7/2004 | | |
| JP | 2005-195076 | A | | 7/2005 | | |
| JP | 2011-156613 | A | | 8/2011 | | |
| JP | 2016-101647 | A | | 6/2016 | | |
| JP | 2017-052013 | A | | 3/2017 | | |
| JP | 6508703 | B2 | * | 5/2019 | | B25J 19/06 |
| JP | 6635331 | B2 | * | 1/2020 | | |
| JP | 2021-070098 | A | | 5/2021 | | |
| WO | WO-1983001407 | A1 | * | 10/1983 | | |
| WO | 2016/104806 | A1 | | 6/2016 | | |
| WO | 2021/113704 | A1 | | 6/2021 | | |
| WO | 2021/170370 | A1 | | 9/2021 | | |
| WO | WO-2023032217 | A1 | * | 3/2023 | | |

OTHER PUBLICATIONS

L. Bogdan and E. Toma, "New Solution for Telescopic Robotic Arm," AMM, vol. 658, pp. 557-562, Oct. 2014, doi: 10.4028/www.scientific.net/amm.658.557. Available: http://dx.doi.org/10.4028/www.scientific.net/AMM.658.557 (Year: 2014) (Year: 2014).*

Office Action dated Jan. 20, 2026 issued in Japanese patent application No. 2022-089099.

* cited by examiner

Figure 6:
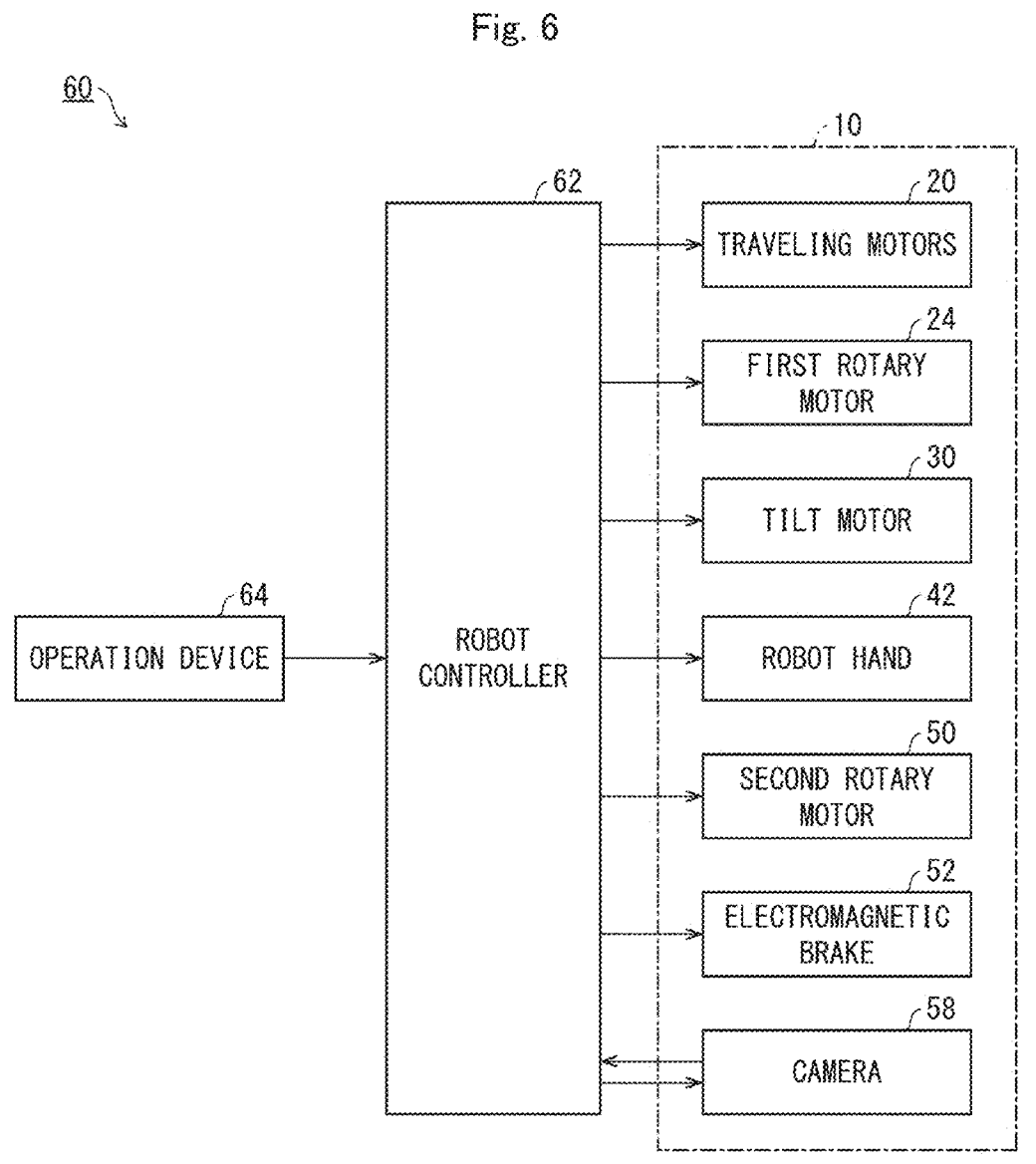

64
OPERATION DEVICE

ROBOT
CONTROLLER

20
TRAVELING MOTORS

24
FIRST ROTARY
MOTOR

30
TILT MOTOR

42
ROBOT HAND

50
SECOND ROTARY
MOTOR

52
ELECTROMAGNETIC
BRAKE

58
CAMERA

Fig. 7
Fig.7A
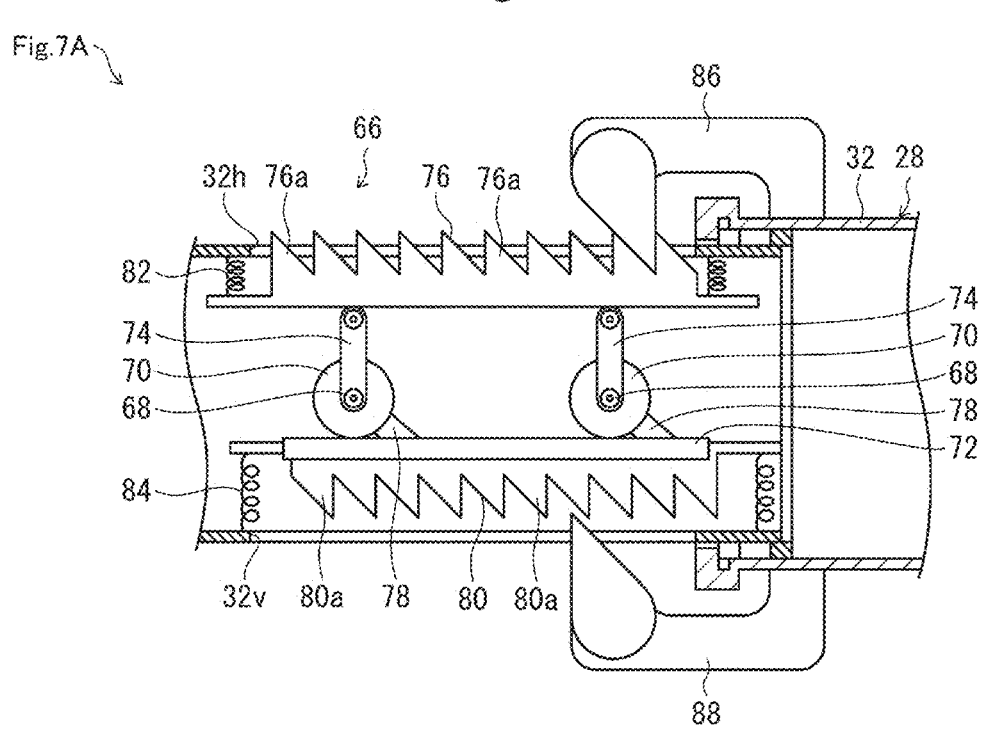
Fig.7B
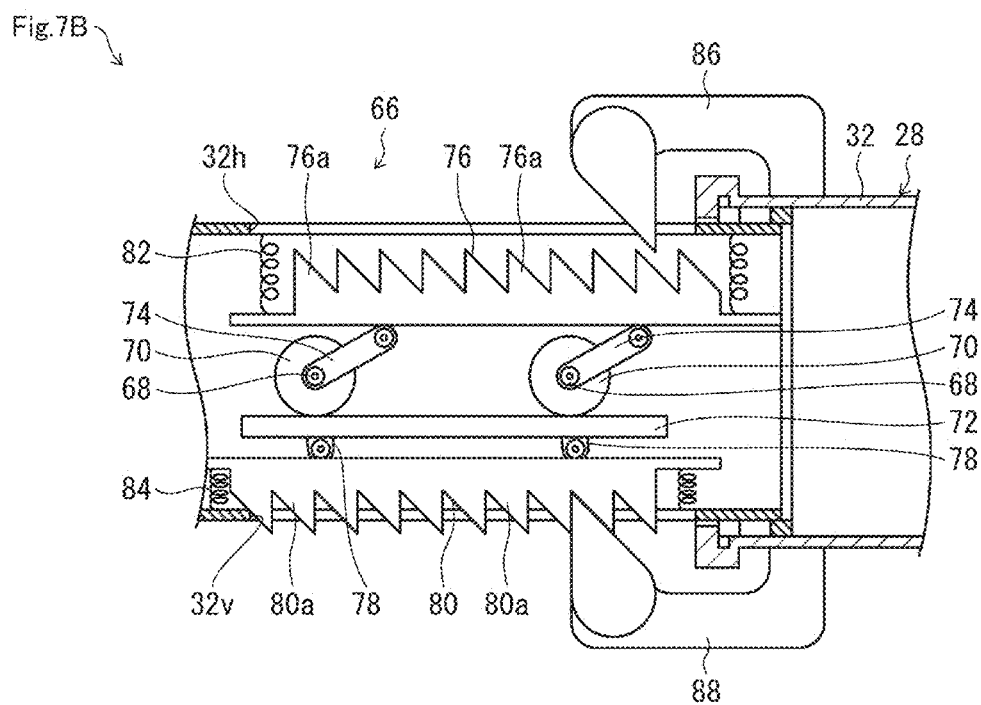

PICKING-UP ROBOT

This Nonprovisional application claims priority under 35 U.S.C. § 119 on patent application No. 2022-089099 filed in Japan on May 31, 2022, the entire contents of which are hereby incorporated by reference.

TECHNICAL FIELD

The present invention relates to a picking-up robot that picks up an article.

BACKGROUND ART

As a picking-up robot that picks up rubble, which is an example of the article, Patent Literature 1 discloses a picking-up robot that is described briefly as follows: The picking-up robot (referred to as a multi-arm mobile robot in Patent Literature 1) of the conventional technique includes a traveling body capable of traveling on the ground. The traveling body has a strut (referred to as a trunk part in Patent Literature 1) set upright thereon. The strut has a multiarticular robot arm (referred to as an arm part in Patent Literature 1) provided on the upper end side. The robot arm has a robot hand (referred to as a crab in Patent Literature 1) that grasps rubble, the robot hand being provided at the distal end.

CITATION LIST

Patent Literature

[Patent Literature 1]
Japanese Patent Application Publication, Tokukai, No. 2017-52013

SUMMARY OF INVENTION

Technical Problem

Incidentally, since the robot arms of picking-up robots of the conventional techniques are configured so as to be multiarticular, there is a trend toward larger picking-up robots. This presents the following problems: It is difficult to transfer the picking-up robot to a predetermined site which is, for example, a disaster area in a short time, and the operation of transferring the picking-up robot therefore becomes complicated; and a storage space for storing the picking-up robot before and after the use of the picking-up robot enlarges.

To address the problems, an object of an aspect of the present invention is to successfully make a picking-up robot more compact, to enhance the workability in the operation of transferring the picking-up robot and also reduce the space for storing the picking-up robot.

Solution to Problem

In order for the above problems to be solved, a picking-up robot in accordance with an aspect of the present invention includes: a robot arm; a robot hand; a push chain; a sprocket; and a rotary motor. The robot arm is a telescopic robot arm having a plurality of arm tubes that fit one within another in a nested manner, and is attached to a strut on an upper end side of the strut so as to be capable of tilting in an up-and-down direction. The robot hand is provided at a distal end of the robot arm, and grasps an article. The push chain is inserted in the robot arm, and has an end that is connected to a foremost arm tube of the plurality of arm tubes. The sprocket is rotatably attached to the strut, and the push chain is engaged on the sprocket. The rotary motor rotates the sprocket.

Advantageous Effects of Invention

According to an aspect of the present invention, it is possible to enhance the workability in the operation of transferring a picking-up robot and also reduce the space for storing the picking-up robot, by successfully making the picking-up robot more compact.

BRIEF DESCRIPTION OF DRAWINGS

FIG. 6 is a block diagram of a picking-up system in accordance with the present embodiment.

FIG. 7 is a schematic cross-sectional view of a movement restriction mechanism in accordance with another aspect of the present embodiment.

DESCRIPTION OF EMBODIMENTS

Figure 1:
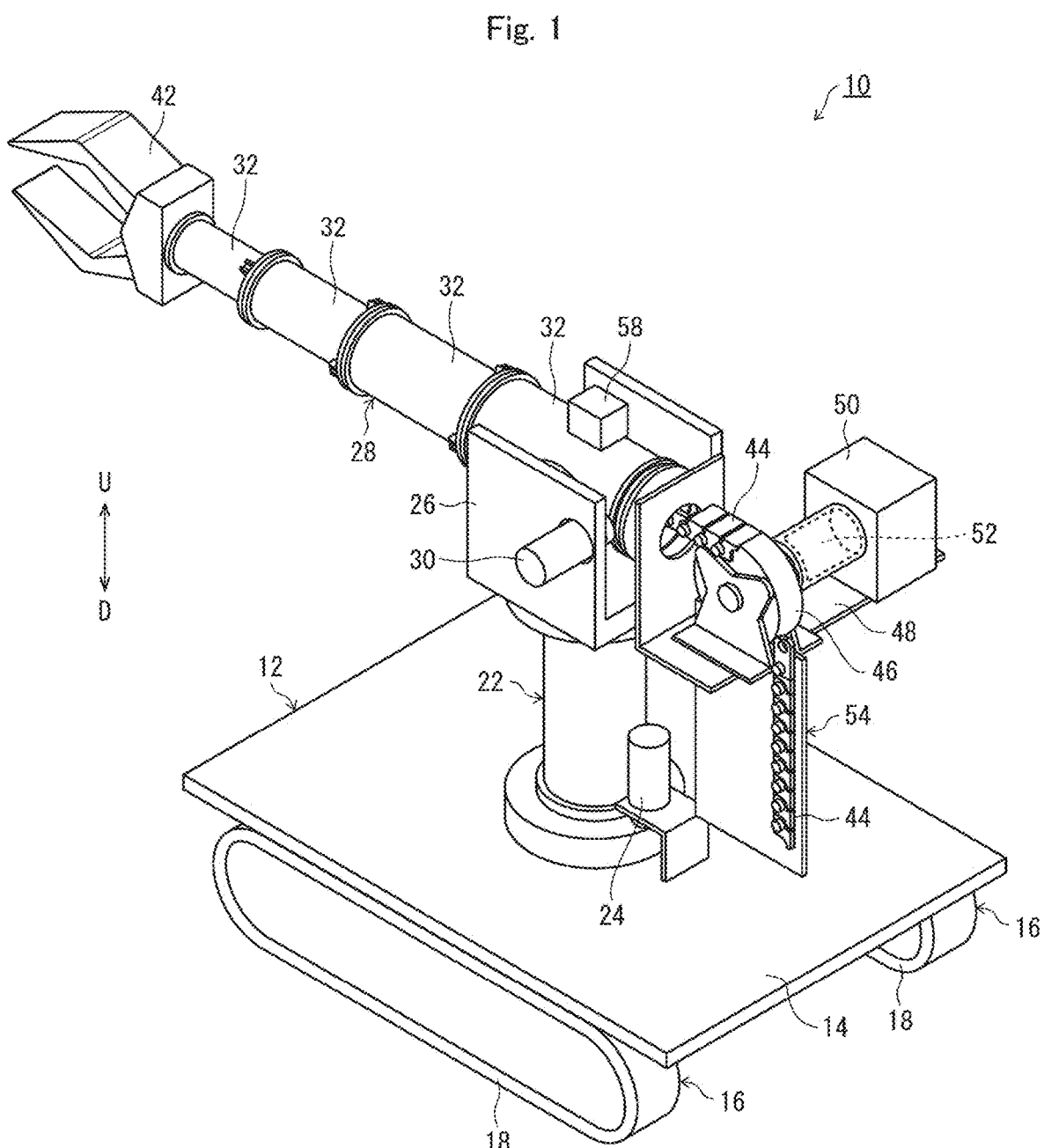
FIG. 1 is a schematic perspective view of a picking-up robot in accordance with the present embodiment.

The following description will discuss the present embodiment and another aspect of the present embodiment with reference to the drawings. The symbols "U" and "D" in the drawings refer to the upward direction and the downward direction, respectively.

As illustrated in FIG. 1, a picking-up robot 10 in accordance with the present embodiment is a self-propelled robot that picks up rubble which is an example of an article, and is used in rubble cleanup operation in disaster areas. The term "picking up" is intended to include, in addition to picking up the article, conveying or transporting the article having been picked up. Note that the picking-up robot 10 may pick up an article other than rubble.

Figure 2:
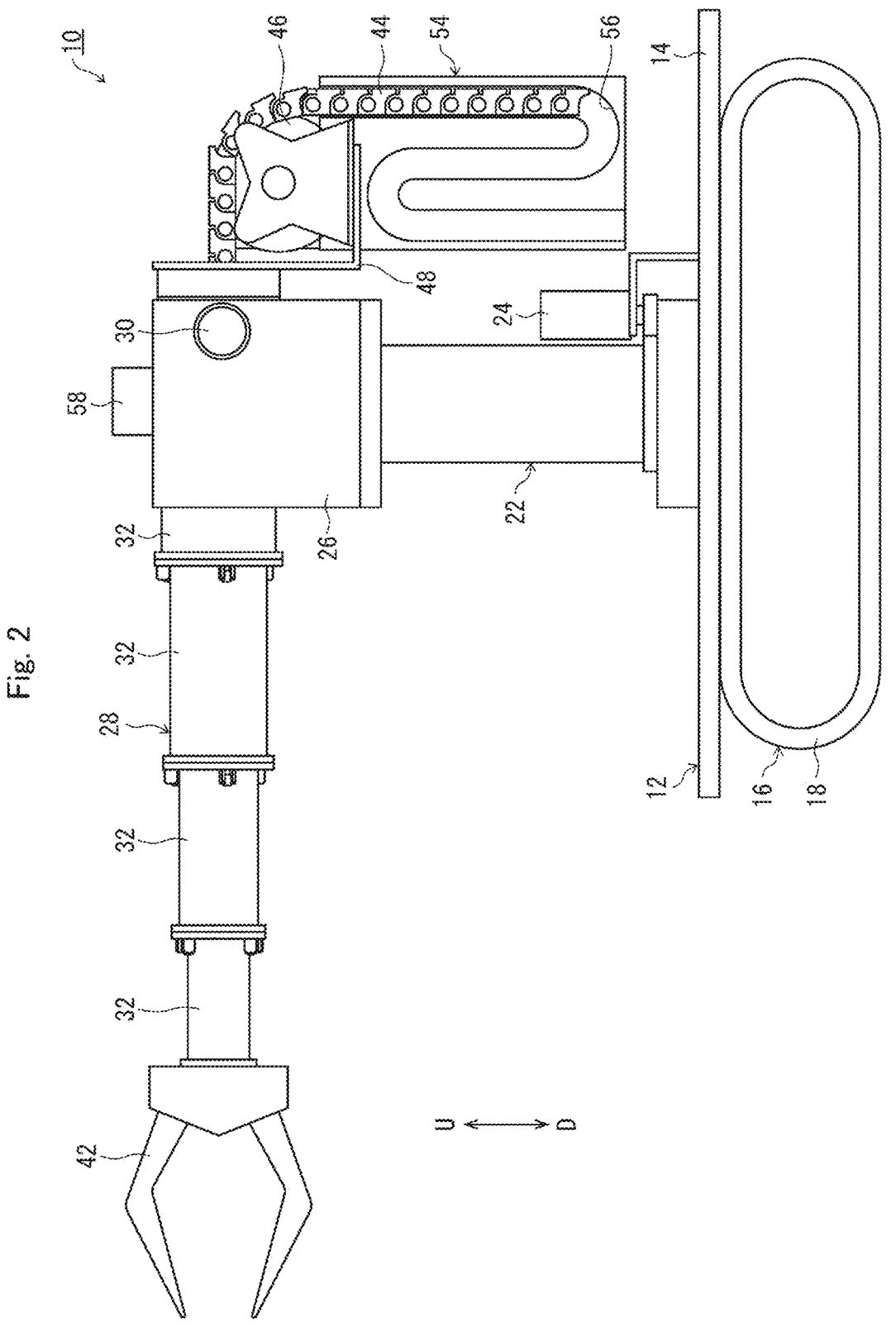
FIG. 2 is a schematic side view of the picking-up robot, illustrated in FIG. 1, having a robot arm extended.
Figure 3:
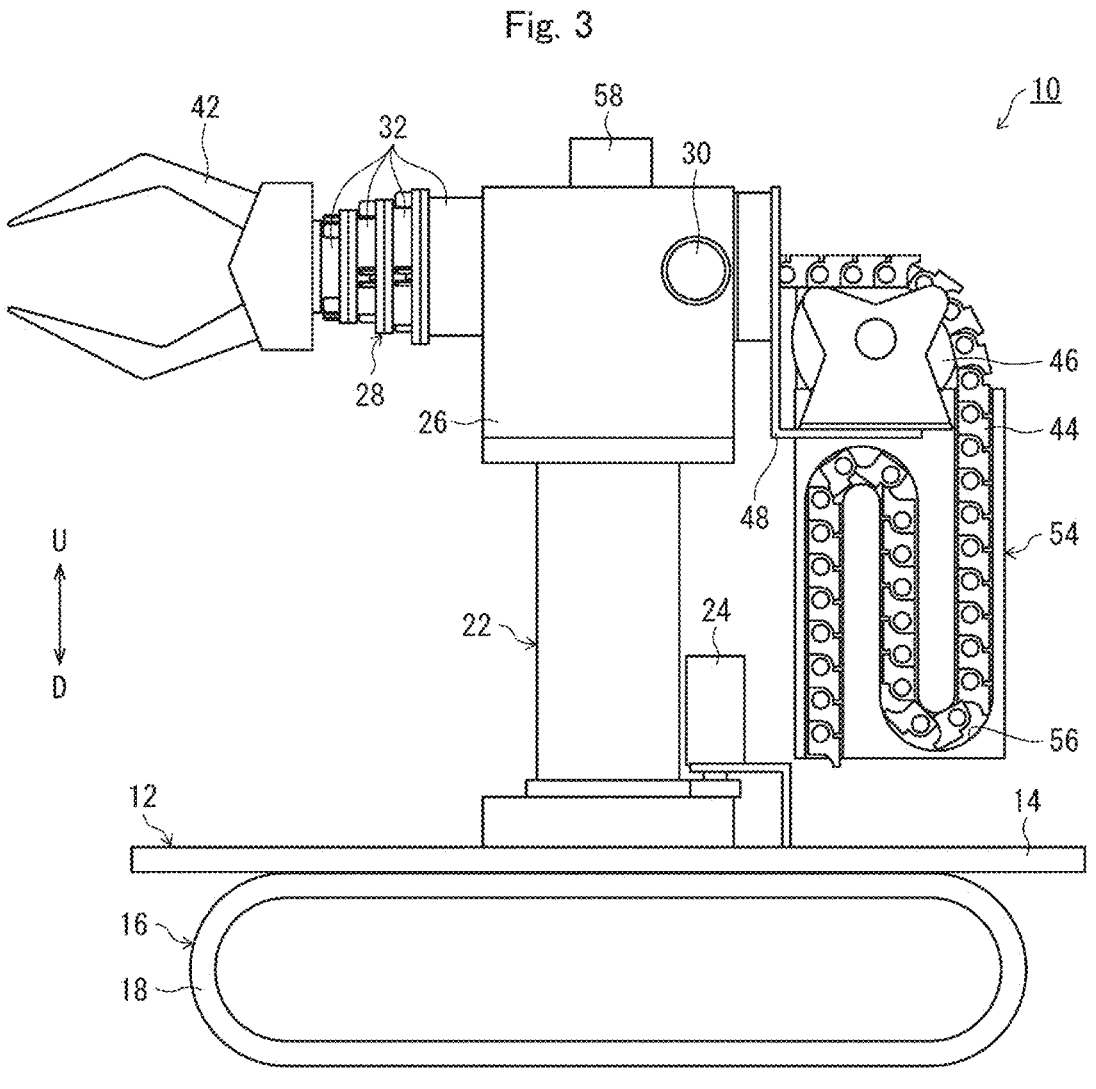
FIG. 3 is a schematic side view of the picking-up robot, illustrated in FIG. 1, having the robot arm contracted.

As illustrated in FIGS. 1 to 3, the picking-up robot 10 includes a traveling body 12 capable of traveling on the ground. The traveling body 12 includes: a traveling stage 14; and two crawlers 16 provided under the traveling stage 14. The crawlers 16 each include a traveling belt 18, and an electrically powered traveling motor 20 (see FIG. 6) for revolving the traveling belt 18. The traveling body 12 includes a direction switching mechanism (not illustrated) for switching the traveling direction thereof. Note that the traveling body 12 is not limited to the traveling body having the crawlers 16, but may be a traveling body having a plurality of wheels (not illustrated) rotatably attached to the traveling stage 14, instead of having the crawlers 16. The plurality of wheels may be of front-wheel drive, may be of rear-wheel drive, or may be of all-wheel drive. The plurality of wheels may be driven independently of each other.

As illustrated in FIGS. 1 to 3, a strut 22 is set upright on the traveling stage 14, and the strut 22 is capable of rotating about the axis thereof. At an appropriate location in the traveling stage 14, an electrically powered first rotary motor 24 is provided. The first rotary motor 24 causes the strut 22 to rotate about the axis of the strut 22. Further, the strut 22 has a U-shaped arm supporting section 26 on the upper end side thereof.

Figure 4:
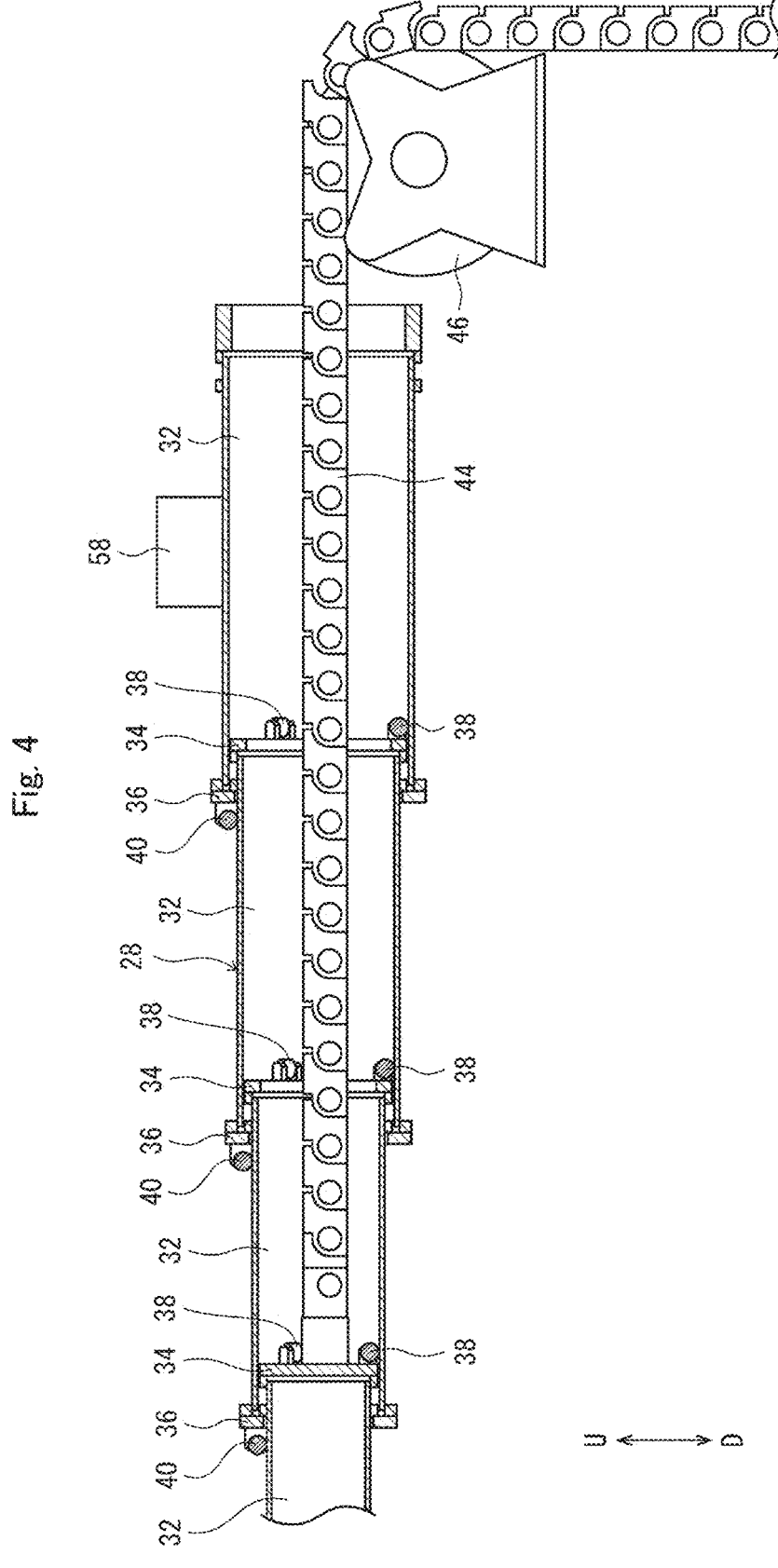
FIG. 4 is a schematic cross-sectional view of a part of the picking-up robot, illustrated in FIG. 1, having the robot arm extended.
Figure 5:
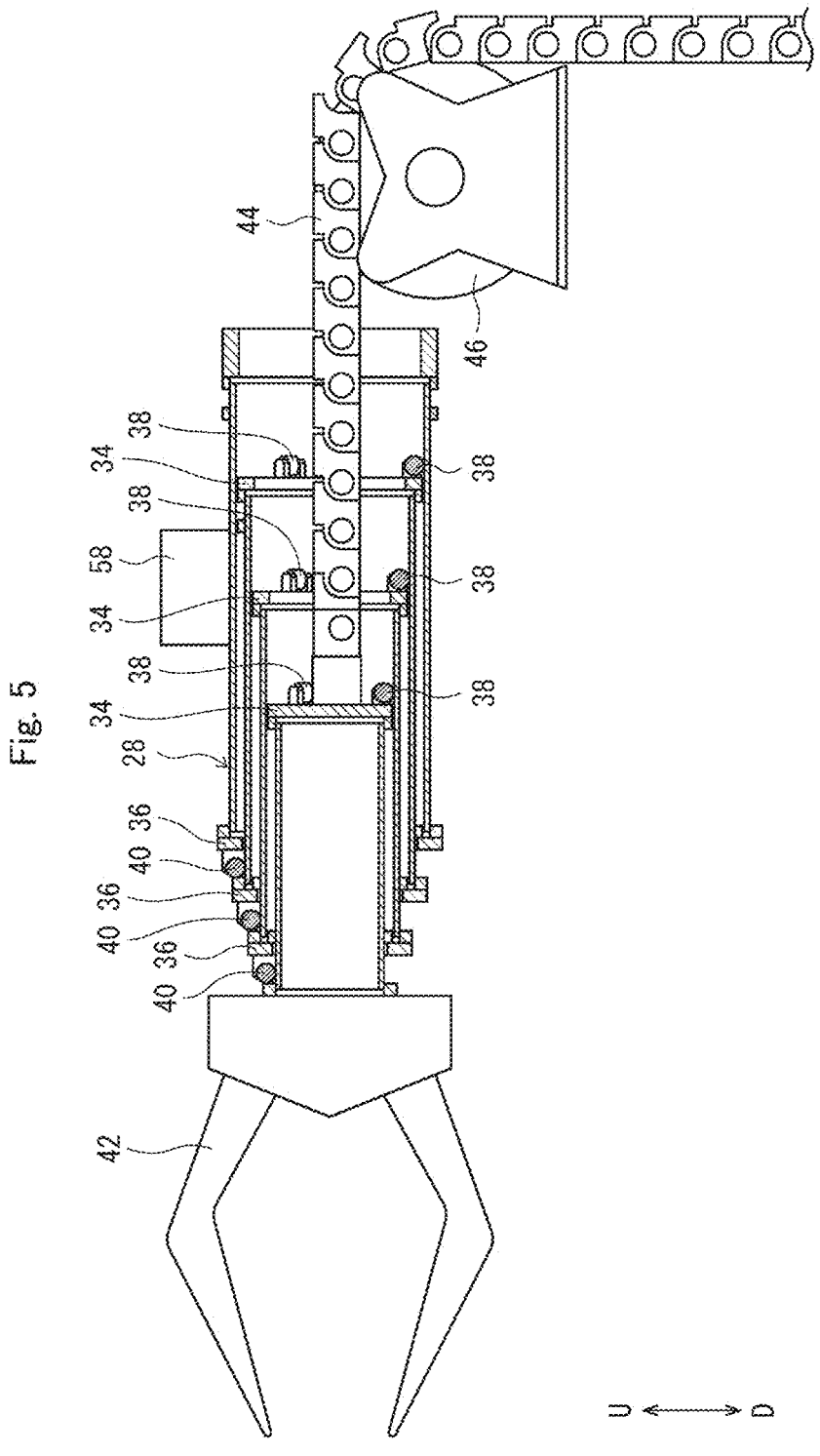
FIG. 5 is a schematic cross-sectional view of a part of the picking-up robot, illustrated in FIG. 1, having the robot arm contracted.

As illustrated in FIGS. 2 to 5, in the arm supporting section 26 of the strut 22, a telescopic robot arm 28 is provided so as to be capable of tilting in an up-and-down direction. In an appropriate location in the arm supporting section 26 of the strut 22, an electrically powered tilt motor is provided. The tilt motor 30 causes the robot arm 28 to tilt in the up-and-down direction. The robot arm 28 has a plurality of arm tubes 32 that fit one within another in a nested manner. The arm tubes 32 are each formed into a circular tube. The arm tubes 32 may each be formed into a rectangular or square tube, instead of a circular tube. Of a pair of arm tubes 32, fitting one within another, of the plurality of arm tubes 32, an inner arm tube 32 has an annular outer flange 34 provided on a proximal end-side of the inner arm tube 32 so as to protrude outward, as illustrated in FIGS. 4 and 5. Of a pair of arm tubes 32, fitting one within another, of the plurality of arm tubes 32, an outer arm tube 32 has an annular inner flange 36 provided on a distal end-side of the outer arm tube 32 so as to protrude inward, the inner flange 36 being capable of contacting the outer flange 34. As used herein, the term "outward" refers to a direction toward the outside of the arm tube 32 concerned, and the term "inward" refers to a direction toward the inside of the arm tube 32 concerned.

Of a pair of arm tubes 32, fitting one within another, of the plurality of arm tubes 32, the inner arm tube 32 has a plurality of first cam followers 38 provided on the proximal end-side of the inner arm tube 32, the plurality of first cam followers 38 being a plurality of first rolling elements that roll to move on the inner circumferential surface of the outer arm tube 32, as illustrated in FIGS. 4 and 5. The plurality of first cam followers 38 are spaced in a circumferential direction of the inner arm tube 32. Of a pair of arm tubes 32, fitting one within another, of the plurality of arm tubes 32, the outer arm tube 32 has a plurality of second cam followers 40 provided on the distal end-side of the outer arm tube 32, the plurality of second cam followers 40 being a plurality of second rolling elements that roll to move on the outer circumferential surface of the inner arm tube 32. The plurality of second cam followers 40 are spaced in a circumferential direction of the outer arm tube 32.

As illustrated in FIGS. 1 and 3, a robot hand 42 that grasps an article such as rubble is provided at a distal end of a foremost arm tube 32, which is located at the distal end of the robot arm 28. The robot hand 42 has a publicly known configuration, and may be provided at the distal end of the robot arm 28 so as to be capable of rotating about the shaft center of the robot arm 28.

As illustrated in FIGS. 2 to 5, a push chain 44 for extending and contracting the robot arm 28 is inserted in the robot arm 28. The push chain 44 has a distal end which is connected to the proximal end of the foremost arm tube 32 of the plurality of arm tubes 32. The push chain 44 has a publicly known configuration, and is designed to bend in one direction and not to bend in any other direction.

As illustrated in FIGS. 1 to 3, a sprocket 46 is provided in the arm supporting section 26 of the strut 22 via a bracket 48 so as to be capable of rotating about a horizontal rotation axis. A part of the push chain 44 is engaged on the sprocket 46. Further, in the arm supporting section 26 of the strut 22, an electrically powered second rotary motor 50 for rotating the sprocket 46 is provided via the bracket 48. Between the sprocket 46 and the second rotary motor 50, an electromagnetic brake 52 for putting a brake on rotation of the second rotary motor 50 is provided. Note that the second rotary motor 50 itself may include an electromagnetic brake, instead of providing the electromagnetic brake 52 as described above.

As illustrated in FIGS. 1 to 3, a chain rack 54 for housing a part of the push chain 44 is provided in the arm supporting section 26 of the strut 22. The chain rack 54 includes a chain guide 56 (see FIGS. 2 and 3) for guiding a part of the push chain 44 in the up-and-down direction. Note that the illustration of the chain guide 56 is omitted in FIG. 1.

As illustrated in FIGS. 1 and 2, the robot arm 28 has a camera 58 provided on the proximal end-side thereof. The camera 58 is an image taking section for taking an image of an environment surrounding an article which includes an article such as rubble. The camera 58 includes a charge coupled device (CCD) or a complementary metal oxide semiconductor (CMOS), which is an image taking device. Note that the camera 58 may be provided in the arm supporting section 26 of the strut 22, instead of being provided on the proximal end-side of the robot arm 28.

As illustrated in FIGS. 1 to 3, each of the traveling belts 18 is driven by the corresponding traveling motor 20 so as to revolve. This enables the picking-up robot 10 to appropriately travel. Further, the strut 22 is driven by the first rotary motor 24 so as to rotate about the shaft center of the strut 22. This enables the robot arm 28 to rotate about the shaft center of the strut 22.

As illustrated in FIGS. 2 and 4, the sprocket 46 is driven by the second rotary motor 50 so as to rotate in a positive direction (the counterclockwise direction in FIGS. 2 and 4), so that the push chain 44 is drawn out of the chain rack 54. As a result, the push chain 44 travels inside the robot arm 28 in the direction away from the sprocket 46. This allows the extending action of the robot arm 28.

As illustrated in FIGS. 3 and 5, the sprocket 46 is driven by the second rotary motor 50 so as to rotate in the reverse direction (the clockwise direction in FIGS. 3 and 5), so that the push chain 44 is delivered to the chain rack 54. As a result, the push chain 44 travels inside the robot arm 28 in the direction of the sprocket 46. This allows the contracting action of the robot arm 28.

As illustrated in FIG. 6, a picking-up system 60 in accordance with the present embodiment is a system for picking up rubble, which is an example of the article. The picking-up system 60 includes: the picking-up robot 10; a robot controller 62 for controlling the action of the picking-up robot 10; and an operation device 64 for remotely operating the picking-up robot 10. The robot controller 62 includes: a memory (not illustrated) that stores, for example, a control program for controlling the action of the picking-up robot 10; and a microprocessor (not illustrated) that interprets and then executes the control program. The robot controller 62 controls the action of the picking-up robot 10 according to the operation instructions issued by the operation device 64. The operation device 64 includes a display section for displaying the result (taken image) of image taking, provided from the camera 58. Note that the picking-up system 60 may be used in picking up an article other than rubble.

The following description will discuss the effects of the present embodiment.

The robot controller 62 controls each of the traveling motors 20 to cause the picking-up robot 10 to travel to the vicinity of rubble. The robot controller 62 controls the first rotary motor 24 to cause the robot arm 28 to rotate about the shaft center of the strut 22, if necessary. Further, the robot controller 62 controls the second rotary motor 50 to cause the robot arm 28 to extend or contract, if necessary. The robot controller 62 then controls a tilt motor 30 and the robot hand 42 to cause the robot arm 28 to tilt downward, so that the robot hand 42 grasps rubble. The robot controller 62 further controls the tilt motor 30 to cause the robot arm 28 to tilt upward. This enables the picking-up robot 10 to take rubble out.

Subsequently, the robot controller 62 controls each of the traveling motors 20 to cause the picking-up robot 10 to travel to the vicinity of a predetermined placement site. The robot controller 62 controls the first rotary motor 24 to cause the robot arm 28 to rotate about the shaft center of the strut 22, if necessary. Further, the robot controller 62 controls the second rotary motor 50 to cause the robot arm 28 to extend or contract, if necessary. The robot controller 62 then controls the tilt motor 30, to cause the robot arm 28 to tilt downward so that the robot hand 42 is located above the predetermined placement site. The robot controller 62 further controls the robot hand 42 to cancel the grasping state of the robot hand 42. This makes it possible to convey or transport rubble to a predetermined placement site.

After causing the robot arm 28 to extend or contract, the robot controller 62 controls the electromagnetic brake 52 to put a brake on rotation of the second rotary motor 50. This makes it possible to fix the position of the robot hand 42 relative to the proximal end of the robot arm 28.

As described above, the robot arm 28 has the plurality of arm tubes 32 that fit one within another in a nested manner, and thus has a telescopic configuration. It is therefore possible for the robot arm 28 to extend and contract. The contracting state of the robot arm 28 makes it possible to successfully make the picking-up robot 10 be more compact. Thus, according to the present embodiment, it is possible to easily transfer the picking-up robot 10 to a predetermined site such as a disaster area in a short time, and it is therefore possible to enhance the workability in the operation of transferring the picking-up robot 10. In addition, it is possible to reduce a storage space for storing the picking-up robot 10 before and after the use of the picking-up robot 10. In particular, in a case of the picking-up robot 10 which includes the traveling body 12 and thus is of a self-propelled type, the contracting state of the robot arm 28 avoids the interference between the robot arm 28 and obstructions and also prevents the picking-up robot 10 from toppling over due to the instability of barycentric balance, to enable the picking-up robot 10 to travel with stability.

Furthermore, the robot arm 28, which has a telescopic configuration, makes it possible to simplify the action of the picking-up robot 10, in comparison with picking-up robots having a multiarticular robot arm. This makes it easier to create the control program for controlling the action of the picking-up robot 10.

Of a pair of arm tubes 32, fitting one within another, of the plurality of arm tubes 32, the inner arm tube 32 has the outer flange 34 provided on the proximal end-side thereof, and the outer arm tube 32 has the inner flange 36 provided on the distal end-side thereof, the inner flange 36 being capable of contacting the outer flange 34, as described above. Thus, according to the present embodiment, it is possible to prevent the inner arm tube 32 from separating from the outer arm tube 32 during the extending or contracting action of the robot arm 28.

Further, of a pair of arm tubes 32, fitting one within another, of the plurality of arm tubes 32, the inner arm tube

32 has the plurality of first cam followers 38 provided on the proximal end-side thereof, and the outer arm tube 32 has the plurality of second cam followers 40 provided on the distal end-side thereof, as described above. Thus, according to the present embodiment, it is possible to stabilize the extending and contracting actions of the robot arm 28 with use of the plurality of first cam followers 38 and the plurality of second cam followers 40. It is also possible to reduce the buckling of the push chain 44 during the extending action of the robot arm 28 and thereby cause the picking-up robot 10 to pick up an article with high accuracy.

As described above, the picking-up robot 10 includes the camera 58, which is an image taking section for taking an image of the environment surrounding the article. Thus, according to the present embodiment, it is possible for a worker to remotely operate the picking-up robot 10 with use of the operation device 64 while checking the results of image taking, provided from the camera 58.

Furthermore, the traveling body 12 includes the two crawlers 16 provided under the traveling stage 14, as described above. Thus, according to the present embodiment, it is possible to cause the picking-up robot 10 to travel with stability even on various irregular grounds caused by disaster.

The following description will discuss another aspect of the present embodiment with reference to FIGS. 5 and 7.

As illustrated in FIG. 7A and FIG. 7B, the picking-up robot 10 includes a movement restriction mechanism 66 for restricting axial movement of the inner arm tube 32 of at least one pair of arm tubes 32, fitting one within another, of the plurality of arm tubes 32, the axial movement being relative to the outer arm tube 32 of the at least one of the pairs. The detailed configuration of the movement restriction mechanism 66 is as follows.

Inside the inner arm tube 32 on the proximal end-side thereof, a pair of rotationally moving shafts 68 is rotatably provided. Each of the rotationally moving shafts 68 extends in the direction orthogonal to the axial direction of the inner arm tube 32. In order for the rotationally moving shafts 68 of the pair to rotationally move in synchronization with each other, each of the rotationally moving shafts 68 has a pinion integrally attached thereto. Inside the inner arm tube 32 on the proximal end-side thereof, a rack 72 that meshes with the pinions 70 is provided. The rack 72 extends in the axial direction of the inner arm tube 32, and is driven by an electrically powered actuator (not illustrated) so as to move in the axial direction of the inner arm tube 32.

Each of the rotationally moving shafts 68 has a first pivot link 74 integrally connected thereto at one end of the first pivot link 74. This causes a pair of first pivot links 74 to pivot in conjunction with rotational movement of the pair of rotationally moving shafts 68. To the respective other ends of the first pivot links 74 paired with each other, a first engaging member 76 extending in the axial direction of the inner arm tube 32 is connected. The first engaging member 76 includes engaging teeth 76a having the shape of a saw blade. Further, each of the rotationally moving shafts 68 has a second pivot link 78 integrally connected thereto at one end of the second pivot link 78. This causes a pair of second pivot links 78 to pivot in conjunction with rotational movement of the pair of rotationally moving shafts 68. To the respective other ends of the second pivot links 78 paired with each other, a second engaging member 80 extending in the axial direction of the inner arm tube 32 is connected. The second engaging member 80 includes engaging teeth 80a having the shape of a saw blade. The second engaging member 80 is opposed to the first engaging member 76.

The first engaging member 76 and the second engaging member 80 are designed so as to protrude from and go below the outer circumferential surface of the inner arm tube 32 in conjunction with rotational movement of the pair of rotationally moving shafts 68. When one engaging member of the first engaging member 76 and the second engaging member 80 protrudes from the outer circumferential surface of the inner arm tube 32, the other engaging member goes below the outer circumferential surface of the inner arm tube 32. The inner arm tube 32 has a first long hole 32*h* formed on the proximal end-side thereof, for protruding the first engaging member 76 from the outer circumferential surface of the inner arm tube 32. The inner arm tube 32 has a second long hole 32*v* formed on the proximal end-side thereof, for protruding the second engaging member 80 from the outer circumferential surface of the inner arm tube 32. The first engaging member 76 and the second engaging member 80 each are pushed by springs 82 and 84 that are provided inside the inner arm tube 32 on the proximal end-side, in such a direction as to protrude from the outer circumferential surface of the inner arm tube 32.

As illustrated in FIG. 7A, when protruding from the outer circumferential surface of the inner arm tube 32, the first engaging member 76 engages with a first stopper lug 86 attached to the outer arm tube 32 on the distal end-side. The engagement of the engaging teeth 76*a* of the first engaging member 76 with the first stopper lug 86 allows the movement of the inner arm tube 32 relative to the outer arm tube 32 toward one side (contracting direction) of the axial direction, while restricting the movement of the inner arm tube 32 relative to the outer arm tube 32 toward the other side (extending direction) of the axial direction.

As illustrated in FIG. 7B, when protruding from the outer circumferential surface of the inner arm tube 32, the second engaging member 80 engages with a second stopper lug 88 attached to the outer arm tube 32 on the distal end-side. The engagement of the second engaging member 80 with the second stopper lug 88 allows the movement of the inner arm tube 32 relative to the outer arm tube 32 toward the other side (extending direction) of the axial direction, while restricting the movement of the inner arm tube 32 relative to the outer arm tube 32 toward the one side (contracting direction) of the axial direction.

Note that the illustration of the push chain 44 is omitted in FIG. 7, and the movement restriction mechanism 66 is disposed so as not to interfere with the push chain 44.

With the above configuration, in tilting the robot arm 28 upward with the robot hand 42 (see FIG. 1) grasping an article, the rack 72 is driven by the electrically powered actuator so as to move toward one side of the axial direction of the arm tubes 32. This rotationally moves the pair of rotationally moving shafts 68 in the positive direction (the counterclockwise direction in FIG. 7), and thereby causes the first engaging member 76 to protrude from the outer circumferential surface of the inner arm tube 32 and also causes the second engaging member 80 to go below the outer circumferential surface of the inner arm tube 32. As a result, the first engaging member 76 engages with the first stopper lug 86, as illustrated in FIG. 7A. This restricts the movement of the inner arm tube 32 relative to the outer arm tube 32 toward the other side (extending direction) of the axial direction.

In tilting the robot arm 28 downward with the robot hand 42 grasping the article, the rack 72 is driven by the electrically powered actuator so as to move the other side of the axial direction of the arm tubes 32. This rotationally moves the pair of rotationally moving shafts 68 in the reverse direction (the clockwise direction in FIG. 7), and thereby causes the second engaging member 80 to protrude from the outer circumferential surface of the inner arm tube 32 and also causes the first engaging member 76 to go below the outer circumferential surface of the inner arm tube 32. As a result, the second engaging member 80 engages with the second stopper lug 88, as illustrated in FIG. 7B. This restricts the movement of the inner arm tube 32 relative to the outer arm tube 32 toward the one side (contracting direction) of the axial direction. In addition, it is possible to reduce the buckling of the push chain 44 (see FIG. 1).

Thus, according to another aspect of the present embodiment, it is possible to convey or transport rubble with stability, by using the picking-up robot 10.

SUPPLEMENTARY NOTE

The present invention is not limited to the above embodiments, but can be altered by a skilled person in the art within the scope of the claims. The present invention also encompasses, in its technical scope, any embodiment derived by appropriately combining technical means disclosed in the embodiments.

The invention claimed is:

1. A picking-up robot comprising:
a traveling body capable of traveling;
a strut set upright on the traveling body;
a robot arm attached to an arm supporting section located on an upper end side of the strut;
a robot hand that is provided at a distal end of the robot arm and that grasps an article;
a first rotary motor that causes the strut to rotate about an axis of the strut;
a tilt motor that causes the robot arm to tilt in an up-and-down direction; and
a second rotary motor that causes the robot arm to extend and contract, wherein
the robot arm is a telescopic robot arm having a plurality of arm tubes that fit one within another in a nested manner,
the picking-up robot comprising:
a push chain inserted in the plurality of arm tubes and having an end that is connected to a foremost arm tube of the plurality of arm tubes; and
a sprocket which is rotatably attached to the strut and on which the push chain is engaged, wherein
the second rotary motor rotates the sprocket, thereby causing the robot arm to extend and contract.

2. The picking-up robot according to claim 1, wherein of a pair of arm tubes, fitting one within another, of the plurality of arm tubes, an inner arm tube has an outer flange provided on a proximal end-side of the inner arm and protruding outward, and an outer arm tube has an inner flange provided on a distal end-side of the outer arm tube and protruding inward, the inner flange being capable of contacting the outer flange.

3. The picking-up robot according to claim 1, wherein of a pair of arm tubes, fitting one within another, of the plurality of arm tubes, an inner arm tube has a plurality of first rolling elements provided on a proximal end-side of the inner arm tube, the plurality of first rolling elements being circumferentially spaced and rolling to move on an inner circumferential surface of an outer arm tube of the pair, and the outer arm tube has a plurality of second rolling elements provided on a distal end-side of the outer arm tube, the plurality of second rolling elements being circumferentially spaced and rolling to move on an outer circumferential surface of the inner arm tube.

4. The picking-up robot according to claim 1, further comprising a chain rack provided on a lower side of the strut and under the sprocket, having a chain guide which guides the push chain in the up-and-down direction, and housing the push chain.

5. The picking-up robot according to claim 1, further comprising an electromagnetic brake configured to put a brake on rotation of the rotary motor.

6. The picking-up robot according to claim 1, further comprising a movement restriction mechanism for restricting axial movement of an inner arm tube of at least one pair of arm tubes, fitting one within another, of the plurality of arm tubes, the axial movement being relative to an outer arm tube of the at least one pair.

7. The picking-up robot according to claim 1, further comprising an image taking section configured to take an image of an environment surrounding the article.

8. The picking-up robot according to claim 1, wherein the traveling body includes:

a traveling stage on which the strut is set upright; and a crawler provided under the traveling stage.

* * * * *